United States Patent
Chalupa

[11] Patent Number: 5,456,937
[45] Date of Patent: Oct. 10, 1995

[54] GELLAN GUM FLAVOR BEADS

[76] Inventor: William F. Chalupa, 99 St. Croix Ct., Aurora, Ill. 60504

[21] Appl. No.: 265,524

[22] Filed: Jun. 24, 1994

[51] Int. Cl.$^6$ .................................................. A23L 1/054
[52] U.S. Cl. ......................... 426/573; 426/590; 426/591; 426/589; 426/650
[58] Field of Search ..................................... 426/573, 574, 426/575, 576, 577, 578, 590, 591, 650, 651, 589

[56] References Cited

U.S. PATENT DOCUMENTS

| | | | |
|---|---|---|---|
| 3,619,205 | 11/1971 | Levan et al. | 426/590 |
| 3,736,149 | 5/1973 | Knapp et al. | 426/650 |
| 4,326,052 | 4/1982 | Kang et al. | 536/1 |
| 4,326,053 | 4/1982 | Kang et al. | 536/1 |
| 4,503,084 | 3/1985 | Baird et al. | 426/573 |
| 4,980,193 | 12/1990 | Tuason, Jr. et al. | 426/654 |
| 5,084,350 | 1/1992 | Chang et al. | 428/402.2 |
| 5,260,083 | 11/1993 | Brain et al. | 426/573 |
| 5,376,396 | 12/1994 | Clark | 426/573 |

OTHER PUBLICATIONS

Developmental Product Bulletin RC-180, Kelco Polymers in Beverage Products, p. 1-7.

*Primary Examiner*—Jeanette Hunter

[57] ABSTRACT

The invention is a gelled, spherical or substantially spherical bead, comprising gellan gum and one or more beverage or food components. The beads are useful for introducing flavoring, yeast or carbon dioxide components to beverages and foods. The beads can be formed during beverage or food production and introduced to the beverage or food immediately after formation, or they may be formed and stored for later use.

11 Claims, No Drawings

GELLAN GUM FLAVOR BEADS

BACKGROUND OF THE INVENTION

Food and beverage products contain many functional components, including flavorings such as spices, natural and artificial flavors, and gases such as carbon dioxide, which impart certain qualities and properties to the food or beverage.

Flavor is an important characteristic of beverage and food systems. In beverage and food formulations, various ingredients other than flavorings are added to impart other desirable properties, such as viscosity and stability. These additional ingredients often affect flavoring performance by reducing their intensity, or by inducing formation of off flavors.

Flavors can be complex and the number of available flavors is extensive. Flavor is that property of a substance that causes a sensation of taste. Four basic tastes are perceived by taste buds on the tongue: sweet, salty, sour, and bitter. The flavors used are natural, artificial, or combinations and exist in liquid or dry form.

Flavors are classified into the major groups of spices, natural flavors, and artificial flavors. A spice is an aromatic vegetable substance in a whole, broken or ground form which is used as a seasoning. Natural flavors are flavor constituents derived from plant or animal sources. Artificial flavors are flavorings containing all or some portion of non natural materials.

Materials that can be used for flavorings can be grouped as follows: spices and herbs; essential oils and their extracts; fruits and fruit juices: and aliphatic, aromatic, and terpene compounds.

Spices and herbs consist of dried plant products that exhibit flavor and aroma. They are derived from true aromatic vegetable substances from which the volatile and flavoring principles have not been removed.

Essential oils and their extracts are odorous oils obtained from plant material and have the major odor that is characteristic of that material. Most have poor water solubility and most contain terpenes (hydrocarbons of formula $C_{10}H_{16}$ and their oxygenated derivatives $C_{10}H_{16}O$ or $C_{10}H_{18}O$) which contribute to the poor water solubility as well as possibly contributing to the off flavor. Examples are essential oils of bitter almond, anise, and clove. Terpeneless oils are extensions of concentrated essential oils in which the unwanted terpenes are removed. These oils are usually more concentrated and of increased stability and water solubility. Common oils in the terpeneless form are citrus oil, spearmint, and peppermint.

Fruit and fruit juices are natural flavorings obtained from fruits. Whole, crushed, or pureed fruit may be used, but, more commonly, the juice or concentrate is used. Fruit extracts are made by extraction with a water-alcohol mixture.

Aliphatic, aromatic, and terpene compounds refer to synthetic chemicals and isolates from natural materials. This classification encompasses the largest group of flavoring materials.

Flavorings are typically introduced directly into the beverage or food product during product production. Heat stable flavorings can be added at various points during product production, while heat sensitive flavorings are usually added following high temperature processing steps. Carbon dioxide is typically injected into beverage products immediately prior to sealing the beverage container.

The present invention is a gellan gum beverage or food component bead which provides a means for introducing beverage and food components, including flavorings, carbon dioxide and yeast, into beverages and food systems. The beverage or food components are encapsulated in storage stable gellan gum beads.

SUMMARY OF THE INVENTION

The invention is a gelled, substantially spherical bead, comprising gellan gum and one or more beverage or food components. The beads are especially useful for introducing flavoring, carbon dioxide, or yeast components to beverages and foods. The beads can be formed during beverage or food production and introduced to the beverage or food immediately after formation, or they may be formed and stored for later use.

In one class of beads of the invention, the beads comprise gellan gum and one or more flavorings. In another class of beads, the beads comprise gellan gum, one or more other gums, and one or more other flavorings. In another class of beads, the beads comprise gellan gum and carbon dioxide. In another class of beads, the beads comprise gellan gum, one or more other gums, and carbon dioxide. In another class of beads, the beads comprise gellan gum and yeast.

DETAILED DESCRIPTION OF THE INVENTION

The invention is a gelled, spherical or substantially spherical flavor bead, comprising gellan gum and one or more beverage or food components. The spherical shape of the beads is such that all points of the bead surface are equally distant from the bead center. Substantially spherical means that substantially all points of the bead surface are substantially equally distant from the bead center.

The beads of the invention are not flake, rod or cylindrically shaped. Flakes, rods and cylinders are examples of shapes where the distance from the center of the shape to one or more portions of its surface significantly differs from the distance from the center of the shape to other portions of its surface.

Typically, the spherical or substantially spherical beads have diameters of between 2–10 mm.

The beads are useful for introducing components such as flavorings, yeast or carbon dioxide to beverages and foods. The beads can be formed during beverage or food production and introduced to the beverage or food immediately after formation, or they may be formed and stored for later use. The gellan gum bead beverage and food component delivery system is versatile because of its ability to form gelled beads in many different components naturally high in ions. The beads can be optionally dried, making them shelf stable, and rehydrated by adding water. Rehydrated beads release the incorporated component into the beverage or food. Dried gelled beads may be used in dehydrated soup mixes, cereals, granola bars, ice creams, and yogurts.

In one class of beads of the invention, the beads comprise gellan gum and one or more flavorings, e.g. soy sauce, hot sauce, worcestershire sauce, teriyaki sauce, vinegar, garlic, onion, grape, orange, apple, or lemon flavors.

In another class of beads, the beads comprise gellan gum, one or more other gums, e.g. xanthan gum, locust bean gum, or carboxymethylcellulose, and one or more flavorings.

In another class of beads, the beads comprise gellan gum and carbon dioxide.

In another class of beads, the beads comprise gellan gum, one or more other gums, e.g. xanthan gum, locust bean gum, or carboxymethylcellulose, and carbon dioxide.

In another class of beads, the beads comprise gellan gum and yeast.

Gellan gum is a heteropolysaccharide prepared by fermentation of *Pseudomonas elodea* ATCC 31461. Gellan gum is available from Kelco Division of Merck & Co., Inc., under various names, including KELCOGEL, KELCOGEL PC., and KELCOGEL F. Processes for preparing gellan gum include those described in U. S. Pat. Nos. 4,326,052 and 4,326,053. It is useful for a variety of gelling, texturing, stabilizing and film forming applications, particularly as a gelling agent in foods, personal care products and industrial applications.

Flavor gel beads are formed by dripping a prehydrated gellan gum solution into a second solution containing gelling ions and the flavor or flavors to be incorporated into the bead. The beads retain their structure after incorporation into the beverage or food and during consumption. In beverages, the beads serve a dual purpose of delivering the flavor to the beverage and modifying the beverage texture.

The concentration of gellan gum in the prehydrated gellan gum solution can vary depending on the amount of gellan gum desired in the bead. Typically, the concentration of gellan gum is about 1% by weight, but can be as low as 0.25% and as high as 2%. Lower concentrations of gellan gum provide smaller beads. Higher concentrations provide larger beads.

Carbonated gel beads are formed by adding calcium carbonate to the hydrated gellan solution. Calcium carbonate is added to the gellan gum solution as a dispersion. The calcium carbonate/gellan gum dispersion is then extruded into a citric acid solution. As the acid diffuses into the gellan gum bead matrix, the acid sets the gel and causes the calcium carbonate to release carbon dioxide which is trapped inside the gelled bead.

The concentration of gellan gum in the prehydrated gellan gum solution can vary depending on the amount of gellan gum desired in the bead. Typically, the concentration of gellan gum is about 1% by weight, but can be as low as 0.25% and as high as 2%. Lower concentrations of gellan gum provide smaller beads. Higher concentrations provide larger beads. The concentration of calcium carbonate in the gellan gum solution can also vary, but is typically in the range of 1–3% by weight. The concentration of citric acid in the citric acid solution can also vary, but is typically about 1% by weight.

Yeast gel beads are formed by adding yeast to the hydrated gellan solution. The yeast/gellan gum dispersion is then dripped into a calcium chloride solution. As the calcium ion sets the gel, yeast is trapped inside the gelled bead. Sugar flows through the gel matrix into the bead. During fermentation, alcohol is produced in the bead and flows through the gel matrix to the exterior of the bead. The bead thus provides a means for conducting controlled fermentation.

The concentration of gellan gum in the prehydrated gellan gum solution can vary depending on the amount of gellan gum desired in the bead. Typically, the concentration of gellan gum is about 1% by weight, but can be as low as 0.25% and as high as 2%. Lower concentrations of gellan gum provide smaller beads. Higher concentrations provide larger beads. The concentration of yeast in the gellan gum solution can also vary, but is typically in the range of 3–5% by weight. The concentration of calcium chloride in the calcium chloride solution can also vary, but is typically about 1% by weight.

Preparation

Gelled beads are prepared by dripping or depositing a prehydrated solution of gellan gum into a second solution which is high in mono- or divalent ions.

The second solution may be a simple solution containing sodium, calcium, or hydrogen ions provided by salts such as sodium chloride, calcium chloride, or citric acid, and the desired food or beverage component. For preparing flavor beads, the second solution can be a flavored solution that is naturally ionic such as soy sauce, hot sauce, worcestershire sauce, teriyaki sauce, vinegar, garlic, onion, grape, orange, apple, or lemon flavors.

In an exemplary procedure, gellan gum and a sequestrant, e.g., sodium citrate, sodium tripolyphosphate, or sodium hexametaphosphate, are combined in water and heated with agitation to hydrate the gellan gum. The solution is then cooled and dripped into a second solution containing gelling ions and flavoring to form gel beads containing flavoring.

EXAMPLE 1

Soy Sauce Beads

Gelled soy sauce beads were prepared according to the procedure described below.

2.25 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing soy sauce. Sodium ions presently in the soy sauce induced gelation. Remaining soy sauce solution was poured off, leaving soy sauce-containing gel beads. The beads can be stored for later use, or directly incorporated into instant soups, Rame, salad dressing, sauces, and condiments.

EXAMPLE 2

Vinegar Beads

Gelled vinegar beads were prepared according to the procedure described below 2.25 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing vinegar. Acid present in the vinegar induced gelation. Remaining vinegar solution was poured off, leaving vinegar-containing gel beads. The beads can be stored for later use, or directly incorporated into salad dressing or sauces.

EXAMPLE 3

Flavor Concentrate Beads

Gelled flavor concentrate beads were prepared according to the procedure described below.

2.25 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing flavor concentrate such as aquaresins. Various ions present in the flavor concentrate induced gelation. Remaining flavor concentrate solution was poured off, leaving flavor concentrate-containing gel beads. The beads can be stored for later use, or directly incorporated into dry mixes or prepared juices.

EXAMPLE 4

Lemon Juice Beads

Gelled lemon juice beads were prepared according to the procedure described below.

2.25 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing lemon juice. Acid present in the lemon juice induced gelation. Remaining lemon juice solution was poured off, leaving lemon juice-containing gel beads. The beads can be stored for later use, or directly incorporated into beverages.

EXAMPLE 5

Yeast Beads

Gelled yeast beads were prepared according to the procedure described below.

2.25 grams of KELCOGEL gellan gum and 0.75 grams sodium citrate and 0.12 grams yeast were dispersed in 297 grams of water. The solution was heated to 180° F. until gellan gum completely hydrated. The hydrated solution was cooled and dripped into a second solution containing 1% calcium chloride and flavoring. Calcium present in the calcium chloride solution induced gelation. Remaining calcium chloride solution was poured off, leaving yeast-containing gel beads. The beads can be stored for later use in controlled fermentation, or directly incorporated into secondary fermentation of beverages or enzyme production.

EXAMPLE 6

Carbonated Beads

Gelled carbonated beads were prepared according to the procedure described below.

2.25 grams of KELCOGEL gellan gum and 0.75 grams sodium citrate and 0.06 grams calcium carbonate were dispersed in 297 grams of water. The solution was heated to 180° F. until gellan gum completely hydrated. The hydrated solution was cooled and extruded into a second solution containing 10% citric acid. Acid and calcium present in the solution induced gelation. Carbon dioxide formed during gelation was trapped in the formed bead. Remaining solution was poured off, leaving carbonated gel beads. The beads can be stored for later use, or directly incorporated into beverages to form carbonated beverages.

EXAMPLE 7

Fish Flavor Beads

Gelled fish flavor beads were prepared according to the procedure described below.

2.25 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing fish flavor extract. Sodium ions present in the solution induced gelation. Remaining fish flavor extract solution was poured off, leaving fish flavor-containing gel beads. The beads can be stored for later use, or directly incorporated into instant soups.

EXAMPLE 8

Soy Sauce Beads

Gelled soy sauce beads were prepared according to the procedure described below.

1.12 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing soy sauce. Sodium ions presently in the soy sauce induced gelation. Remaining soy sauce solution was poured off, leaving soy sauce-containing gel beads. The beads can be stored for later use, or directly incorporated into instant soups, Rame, salad dressing, sauces, and condiments.

EXAMPLE 9

Vinegar Beads

Gelled vinegar beads were prepared according to the procedure described below 1.12 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing vinegar. Acid present in the vinegar induced gelation. Remaining vinegar solution was poured off, leaving vinegar-containing gel beads. The beads can be stored for later use, or directly incorporated into salad dressing or sauces.

EXAMPLE 10

Flavor Concentrate Beads

Gelled flavor concentrate beads were prepared according to the procedure described below.

1.12 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing flavor concentrate such as aquaresins. Various ions present in the flavor concentrate induced gelation. Remaining flavor concentrate solution was poured off, leaving flavor concentrate-containing gel beads. The beads can be stored for later use, or directly incorporated into dry mixes or prepared juices.

EXAMPLE 11

Lemon Juice Beads

Gelled lemon juice beads were prepared according to the procedure described below.

1.12 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing lemon juice. Acid present in the lemon juice induced gelation. Remaining lemon juice solution was poured off, leaving lemon juice-containing gel beads. The beads can be stored for later use, or directly incorporated into beverages.

EXAMPLE 12

Yeast Beads

Gelled yeast beads were prepared according to the procedure described below.

1.12 grams of KELCOGEL gellan gum and 0.75 grams sodium citrate and 0.12 grams yeast were dispersed in 297 grams of water. The solution was heated to 180° F. until gellan gum completely hydrated. The hydrated solution was cooled and dripped into a second solution containing 1% calcium chloride and flavoring. Calcium present in the calcium chloride solution induced gelation. Remaining calcium chloride solution was poured off, leaving yeast-containing gel beads. The beads can be stored for later use in controlled fermentation, or directly incorporated into secondary fermentation of beverages or enzyme production.

EXAMPLE 13

Carbonated Beads

Gelled carbonated beads were prepared according to the procedure described below.

1.12 grams of KELCOGEL gellan gum and 0.75 grams sodium citrate and 0.06 grams calcium carbonate were dispersed in 297 grams of water. The solution was heated to 180° F. until gellan gum completely hydrated. The hydrated solution was cooled and extruded into a second solution containing 10% citric acid. Acid and calcium present in the solution induced gelation. Carbon dioxide formed during gelation was trapped in the formed bead. Remaining solution was poured off, leaving carbonated gel beads. The beads can be stored for later use, or directly incorporated into beverages to form carbonated beverages.

EXAMPLE 14

Fish Flavor Beads

Gelled fish flavor beads were prepared according to the procedure described below.

1.12 grams of KELCOGEL gellan gum and 0.75 grams s sodium citrate were dispersed in 297 grams of water. The solution was heated to 180° F. until gellan gum completely hydrated. The hydrated solution was cooled and dripped into a second solution containing fish flavor extract. Sodium ions present in the solution induced gelation. Remaining fish flavor extract solution was poured off, leaving fish flavor-containing gel beads. The beads can be stored for later use, or directly incorporated into instant soups.

EXAMPLE 15

Soy Sauce Beads

Gelled soy sauce beads were prepared according to the procedure described below.

4.50 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing soy sauce. Sodium ions presently in the soy sauce induced gelation. Remaining soy sauce solution was poured off, leaving soy sauce-containing gel beads. The beads can be stored for later use, or directly incorporated into instant soups, Rame, salad dressing, sauces, and condiments.

EXAMPLE 16

Vinegar Beads

Gelled vinegar beads were prepared according to the procedure described below 4.50 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing vinegar. Acid present in the vinegar induced gelation. Remaining vinegar solution was poured off, leaving vinegar-containing gel beads. The beads can be stored for later use, or directly incorporated into salad dressing or sauces.

EXAMPLE 17

Flavor Concentrate Beads

Gelled flavor concentrate beads were prepared according to the procedure described below.

4.50 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing flavor concentrate such as aquaresins. Various ions present in the flavor concentrate induced gelation. Remaining flavor concentrate solution was poured off, leaving flavor concentrate-containing gel beads. The beads can be stored for later use, or directly incorporated into dry mixes or prepared juices.

EXAMPLE 18

Lemon Juice Beads

Gelled lemon juice beads were prepared according to the procedure described below.

4.50 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing lemon juice. Acid present in the lemon juice induced gelation. Remaining lemon juice solution was poured off, leaving lemon juice-containing gel beads. The beads can be stored for later use, or directly incorporated into beverages.

EXAMPLE 19

Yeast Beads

Gelled yeast beads were prepared according to the procedure described below.

4.50 grams of KELCOGEL gellan gum and 0.75 grams sodium citrate and 0.12 grams yeast were dispersed in 297 grams of water. The solution was heated to 180° F. until gellan gum completely hydrated. The hydrated solution was cooled and dripped into a second solution containing 1% calcium chloride and flavoring. Calcium present in the calcium chloride solution induced gelation. Remaining calcium chloride solution was poured off, leaving yeast-containing gel beads. The beads can be stored for later use in controlled fermentation, or directly incorporated into secondary fermentation of beverages or enzyme production.

EXAMPLE 20

Carbonated Beads

Gelled carbonated beads were prepared according to the procedure described below.

4.50 grams of KELCOGEL gellan gum and 0.75 grams sodium citrate and 0.06 grams calcium carbonate were dispersed in 297 grams of water. The solution was heated to 180° F. until gellan gum completely hydrated. The hydrated solution was cooled and extruded into a second solution containing 10% citric acid. Acid and calcium present in the solution induced gelation. Carbon dioxide formed during gelation was trapped in the formed bead. Remaining solution was poured off, leaving carbonated gel beads. The beads can be stored for later use, or directly incorporated into beverages to form carbonated beverages.

EXAMPLE 21

Fish Flavor Beads

Gelled fish flavor beads were prepared according to the procedure described below.

4.50 grams of KELCOGEL gellan gum and 0.75 grams sodium citrate were dispersed in 297 grams of water. The solution was heated to 180° F. until gellan gum completely hydrated. The hydrated solution was cooled and dripped into a second solution containing fish flavor extract. Sodium ions present in the solution induced gelation. Remaining fish flavor extract solution was poured off, leaving fish flavor-containing gel beads. The beads can be stored for later use, or directly incorporated into instant soups.

I claim:

1. A gelled, spherical or substantially spherical bead, comprising gellan gum and one or more food or beverage components.

2. A gelled, spherical or substantially spherical bead of claim 1, wherein the components are one or more flavorings.

3. A gelled, spherical or substantially spherical bead of claim 2, comprising gellan gum, one or more other gums, and one or more flavorings.

4. A gelled, spherical or substantially spherical bead of claim 1, wherein the component is carbon dioxide.

5. A gelled, spherical or substantially spherical bead of claim 4, comprising gellan gum, one or more other gums, and carbon dioxide.

6. A gelled, spherical or substantially spherical bead of claim 1, comprising gellan gum and yeast.

7. A gelled, spherical or substantially spherical bead of claim 2, wherein the flavorings are selected from the group consisting of soy sauce, hot sauce, worcestershire sauce, teriyaki sauce, vinegar, garlic, onion, grape, orange, apple, lemon, poultry, fish and meat.

8. A process for preparing a bead of claim 1 comprising dripping a prehydrated solution of gellan gum, wherein the amount of gellan gum is between about 0.25–2.0% by weight, into a second solution containing one or more food or beverage components.

9. A process for preparing a bead of claim 4 comprising adding calcium carbonate to a hydrated gellan gum solution to form a dispersion, extruding the dispersion into a citric acid solution, setting the gel in the solution, releasing carbon dioxide, and trapping the carbon dioxide inside the gelled bead.

10. A method for flavoring a beverage or food which comprises forming a substantially spherical flavor bead of claim 2, and adding the bead to the beverage or food.

11. A method for carbonating a beverage which comprises forming a substantially spherical carbonated bead of claim 4, and adding the bead to the beverage.

* * * * *